US010207655B2

(12) United States Patent
Yoshida et al.

(10) Patent No.: US 10,207,655 B2
(45) Date of Patent: Feb. 19, 2019

(54) LAYERED COMPOSITE COMPONENT (71) Applicant: TOYODA IRON WORKS CO., LTD., Toyota-shi, Aichi (JP)

(72) Inventors: Kenichi Yoshida, Toyota (JP); Hideaki Sakai, Toyota (JP); Osamu Miyashita, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 0 days.

(21) Appl. No.: 15/301,048

(22) PCT Filed: Oct. 18, 2014

(86) PCT No.: PCT/JP2014/077760
§ 371 (c)(1),
(2) Date: Sep. 30, 2016

(87) PCT Pub. No.: WO2016/151322
PCT Pub. Date: Oct. 8, 2015

(65) Prior Publication Data
US 2017/0021779 A1  Jan. 26, 2017

(30) Foreign Application Priority Data

Apr. 2, 2014  (JP) .................................. 2014-076565

(51) Int. Cl.
*B60R 13/02* (2006.01)
*B32B 27/08* (2006.01)
(Continued)

(52) U.S. Cl.
CPC ............ *B60R 13/0243* (2013.01); *B32B 3/06* (2013.01); *B32B 3/266* (2013.01); *B32B 3/30* (2013.01);
(Continued)

(58) Field of Classification Search
CPC . B60R 13/02; B60R 13/0206; B60R 13/0237; B60R 13/0243; F16B 5/0621;
(Continued)

(56) References Cited

U.S. PATENT DOCUMENTS 5,199,149 A * 4/1993 Matsuura .............. F16B 19/086
29/432
6,179,298 B1 * 1/2001 Schweiger ........... F16J 15/0831
24/618

(Continued)

FOREIGN PATENT DOCUMENTS

JP  59-220432  12/1984
JP  8-57172    3/1996

OTHER PUBLICATIONS

Office Action issued in corresponding Japanese patent application No. 2014-076565 dated Oct. 25, 2016.

*Primary Examiner* — Jonathan P Masinick
(74) *Attorney, Agent, or Firm* — Finnegan, Henderson, Farabow, Garrett & Dunner, LLP (57) ABSTRACT A laminated composite part, which includes a first member having a predetermined mating surface, and a second member that is made of an elastically deformable resin material, that has a plate portion substantially parallel to the mating surface and having a multiplicity of protrusions formed integrally therewith so as to protrude toward the mating surface so that space is created between the plate portion and the mating surface, and that is placed on the first member such that the protrusions contact the mating surface, which has cushioning properties as tip ends of the protrusions are pressed against the mating surface and elastically deformed, and in which one of the first and second members which is located on a design surface side has an engaging projection that projects to a larger extent than the protrusions, and the
(Continued)

engaging projection is inserted through an insertion hole formed in the other of the first and second members and is retained in the insertion hole, whereby the first and second members are connected together, the insertion hole being provided with a stopper portion that is engaged with the engaging projection to retain the engaging projection in the insertion hole, in order to allow the engaging projection to move relative to the stopper portion in a direction parallel to the design surface due to a difference in thermal expansion between the first and second members, the stopper portion having a predetermined length in a direction of the relative movement that occurs due to the difference in thermal expansion, the stopper portion being a bridge extending across the insertion hole and having a slit in a middle so as to be separated into a plurality of parts, and the engaging projection having an annular shape and being inserted through the insertion hole such that the engaging projection elastically deforms the bridge and expands the slit, and the bridge thus extending through an opening of the annular shape, so that the engaging projection is retained in the insertion hole by the bridge and is allowed to move relatively in a longitudinal direction of the bridge.

10 Claims, 7 Drawing Sheets

(51) Int. Cl.
  *B32B 3/06* (2006.01)
  *B32B 3/26* (2006.01)
  *B32B 3/30* (2006.01)
(52) U.S. Cl.
  CPC .......... *B32B 27/08* (2013.01); *B60R 13/0206* (2013.01); *B32B 2250/02* (2013.01); *B32B 2307/51* (2013.01); *B32B 2307/734* (2013.01); *B32B 2605/003* (2013.01)
(58) Field of Classification Search
  CPC ...... F16B 5/0628; F16B 5/0642; F16B 5/065; F16B 5/0657; F16B 5/0664; B32B 3/30; B32B 3/06; B32B 3/266
  See application file for complete search history.

(56) References Cited

U.S. PATENT DOCUMENTS

| | | | | |
|---|---|---|---|---|
| 6,769,853 | B2* | 8/2004 | Perrot | F16B 5/0628 296/191 |
| 7,536,755 | B2* | 5/2009 | Nakajima | F16B 5/065 24/297 |
| 8,152,405 | B2* | 4/2012 | Dubost | B60R 13/0206 24/293 |
| 8,567,152 | B2* | 10/2013 | Onuma | B60R 13/0206 52/716.5 |
| 8,793,845 | B2* | 8/2014 | Benedetti | F16B 5/065 24/292 |
| 8,859,074 | B2* | 10/2014 | Preisler | B62D 25/20 296/39.1 |
| 8,943,655 | B2* | 2/2015 | Kabeya | B60R 11/0217 24/453 |
| 9,067,540 | B2* | 6/2015 | Watanabe | B60R 7/06 |
| 9,103,361 | B2* | 8/2015 | Tanabe | F16B 2/20 |
| 9,132,789 | B2* | 9/2015 | Suzuki | B60R 13/0206 |
| 9,528,538 | B2* | 12/2016 | Naoi | F16B 5/0642 |
| 9,682,530 | B2* | 6/2017 | Miyashita | B32B 3/30 |
| 2002/0039518 | A1* | 4/2002 | Schwarz | B60R 13/0206 403/329 |
| 2003/0107202 | A1* | 6/2003 | Tajima | B60R 13/0206 280/728.3 |
| 2004/0052575 | A1* | 3/2004 | Draggoo | B60R 13/0206 403/298 |
| 2005/0054229 | A1* | 3/2005 | Tsuya | B60R 13/0206 439/280 |
| 2006/0001291 | A1* | 1/2006 | Dooley | B60N 2/466 296/153 |
| 2006/0085955 | A1* | 4/2006 | Asano | B60R 13/0206 24/297 |
| 2015/0010349 | A1* | 1/2015 | Mochizuki | B60K 37/02 403/345 |

* cited by examiner

LAYERED COMPOSITE COMPONENT

CROSS-REFERENCE TO RELATED APPLICATIONS

This application is a national phase application of International Application No. PCT/JP2014/077760, filed Oct. 18, 2014, and claims the priority of Japanese Application No. 2014-076565, filed Apr. 2, 2014, the content of both of which is incorporated herein by reference.

TECHNICAL FIELD

The present invention relates to laminated composite parts, and more particularly to an improvement in laminated composite parts which have cushioning properties due to elastic deformation of a multiplicity of protrusions and in which a first member and a second member are connected together by an engaging projection.

BACKGROUND ART

Laminated composite parts are known, including (a) a first member having a predetermined mating surface, and (b) a second member that is made of an elastically deformable resin material, that has a plate portion substantially parallel to the mating surface and having a multiplicity of protrusions formed integrally therewith so as to protrude toward the mating surface so that space is created between the plate portion and the mating surface, and that is placed on the first member such that the protrusions contact the mating surface, the laminated composite parts having (c) cushioning properties as tip ends of the protrusions are pressed against the mating surface and elastically deformed, and (d) in which one of the first and second members which is located on a design surface side has an engaging projection that projects to a larger extent than the protrusions, and the engaging projection is inserted through an insertion hole formed in the other of the first and second members and is retained in the insertion hole, whereby the first and second members are connected together. A buffer structure described in Patent Document 1 is an example of such laminated composite parts. This buffer structure relates to an interior part for vehicles etc. A multiplicity of rib-like protrusions are provided on the back surface of an upholstery material (surface member) serving as the second member, whereby an excellent feel (soft feel) is provided by elastic deformation of the protrusions. Moreover, the engaging projection (attachment rib) provided on the back surface of the upholstery material is retained by the first member (core), whereby the upholstery material is prevented from being lifted regardless of the difference in thermal expansion.

RELATED ART DOCUMENTS

Patent Documents

Patent Document 1: Japanese Patent Application Publication No. H08-57172

SUMMARY OF THE INVENTION

Problem to be Solved by the Invention

Figure 12:
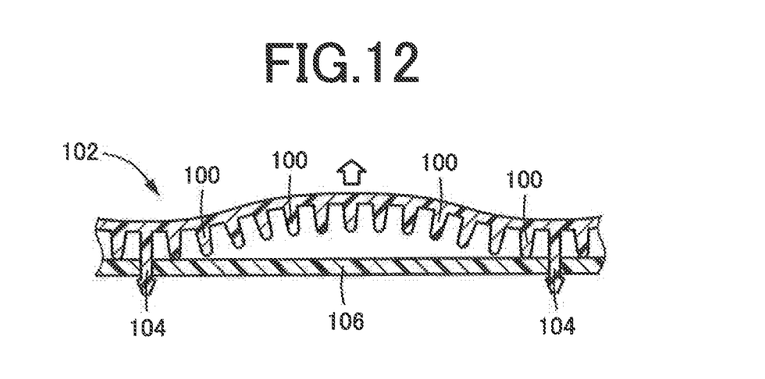
FIG. 12 is a sectional view of an example of a conventional laminated composite part, showing the state where an upholstery material is partially lifted due to the difference in thermal expansion.

Even in such laminated composite parts in which the first and second members are connected together by the engaging projection, a gap may still appear between the first and second members depending on the position, interval, etc. of the engaging projection or projections, and the design surface may therefore become loose or wrinkled or be lifted, which may adversely affect the product quality. That is, as shown in FIG. 12, even if an upholstery material (second member) 102 having a multiplicity of projections 100 is fixed to a base member (first member) 106 by a plurality of engaging projections 104, the upholstery material 102 may become loose and be lifted in a region between the plurality of engaging projections 104 at high temperatures due to the difference in thermal expansion between the upholstery material 102 and the base member 106.

The present invention was developed in view of the above circumstances, and it is an object of the present invention to more appropriately prevent a design surface from becoming loose, being lifted, etc. regardless of the difference in thermal expansion in a laminated composite part in which a first member and a second member are connected together by an engaging projection.

Solution to Problem

To achieve the above object, a first aspect of the invention provides a laminated composite part, which includes (a) a first member having a predetermined mating surface, and (b) a second member that is made of an elastically deformable resin material, that has a plate portion substantially parallel to the mating surface and having a multiplicity of protrusions formed integrally therewith so as to protrude toward the mating surface so that space is created between the plate portion and the mating surface, and that is placed on the first member such that the protrusions contact the mating surface, (c) which has cushioning properties as tip ends of the protrusions are pressed against the mating surface and elastically deformed, and (d) in which one of the first and second members which is located on a design surface side has an engaging projection that projects to a larger extent than the protrusions, and the engaging projection is inserted through an insertion hole formed in the other of the first and second members and is retained in the insertion hole, whereby the first and second members are connected together, characterized in that (e) the insertion hole is provided with a stopper portion that is engaged with the engaging projection to retain the engaging projection in the insertion hole, (f) in order to allow the engaging projection to move relative to the stopper portion in a direction parallel to the design surface due to a difference in thermal expansion between the first and second members, the stopper portion has a predetermined length L in a direction of the relative movement that occurs due to the difference in thermal expansion, (g) the stopper portion is a bridge extending across the insertion hole and having a slit in a middle so as to be separated into a plurality of parts, and (h) the engaging projection has an annular shape and is inserted through the insertion hole such that the engaging projection elastically deforms the bridge and expands the slit, and the bridge thus extends through an opening of the annular shape, so that the engaging projection is retained in the insertion hole by the bridge and is allowed to move relatively in a longitudinal direction of the bridge.

A second aspect of the invention provides a laminated composite part, which includes (a) a first member having a predetermined mating surface, and (b) a second member that is made of an elastically deformable resin material, that has a plate portion substantially parallel to the mating surface and having a multiplicity of protrusions formed integrally therewith so as to protrude toward the mating surface so that space is created between the plate portion and the mating surface, and that is placed on the first member such that the protrusions contact the mating surface, (c) which has cushioning properties as tip ends of the protrusions are pressed against the mating surface and elastically deformed, and (d) in which one of the first and second members which is located on a design surface side has an engaging projection that projects to a larger extent than the protrusions, and the engaging projection is inserted through an insertion hole formed in the other of the first and second members and is retained in the insertion hole, whereby the first and second members are connected together, characterized in that (e) the insertion hole is provided with a stopper portion that is engaged with the engaging projection to retain the engaging projection in the insertion hole, (0 in order to allow the engaging projection to move relative to the stopper portion in a direction parallel to the design surface due to a difference in thermal expansion between the first and second members, the stopper portion has a predetermined length L in a direction of the relative movement that occurs due to the difference in thermal expansion, (g) the stopper portion is a hook portion that projects into the insertion hole like a cantilever, and (h) the engaging projection has an annular shape, the engaging projection is inserted through the insertion hole and is held by the hook portion so that the engaging projection is retained in the insertion hole, and the engaging projection is allowed to move relatively in a longitudinal direction of the hook portion.

A third aspect of the invention provides the laminated composite part recited in the first or second aspect of the invention, characterized in that the stopper portion has a tilt so that the engaging projection is guided further into the insertion hole as a result of the relative movement that occurs due to the difference in thermal expansion in a direction in which the design surface becomes loose.

A fourth aspect of the invention provides a laminated composite part, which includes (a) a first member having a predetermined mating surface, and (b) a second member that is made of an elastically deformable resin material, that has a plate portion substantially parallel to the mating surface and having a multiplicity of protrusions formed integrally therewith so as to protrude toward the mating surface so that space is created between the plate portion and the mating surface, and that is placed on the first member such that the protrusions contact the mating surface, (c) which has cushioning properties as tip ends of the protrusions are pressed against the mating surface and elastically deformed, and (d) in which one of the first and second members which is located on a design surface side has an engaging projection that projects to a larger extent than the protrusions, and the engaging projection is inserted through an insertion hole formed in the other of the first and second members and is retained in the insertion hole, whereby the first and second members are connected together, characterized in that (e) the insertion hole is provided with a stopper portion that is engaged with the engaging projection to retain the engaging projection in the insertion hole, (f) in order to allow the engaging projection to move relative to the stopper portion in a direction parallel to the design surface due to a difference in thermal expansion between the first and second members, the stopper portion has a predetermined length L in a direction of the relative movement that occurs due to the difference in thermal expansion, and (g) the stopper portion has a tilt so that the engaging projection is guided further into the insertion hole as a result of the relative movement that occurs due to the difference in thermal expansion in a direction in which the design surface becomes loose.

Advantageous Effects of the Invention

In such laminated composite parts recited in the first to fourth aspects of the invention, the stopper portions that are engaged with the engaging projections and retain the engaging projections in the insertion hole have the predetermined length L, and the engaging projections are allowed to move relatively within the range of the length dimension L in the direction parallel to the design surface due to the difference in thermal expansion between the first and second members. This appropriately restrains the design surface from becoming loose or wrinkled, being lifted, etc. due to the difference in thermal expansion and improves the product quality. That is, since the engaging projections can move relatively, an effect due to the difference in thermal expansion is reduced (lessened) as one of the first and second members moves to a peripheral portion of normal temperature etc. where the difference in thermal expansion is smaller. Accordingly, local loosening or local lifting of the upholstery material 102 as in the case where the engaging projections 104 are placed at the fixed positions as in FIG. 12 can be inhibited.

The first aspect of the invention is directed to the case where the bridge having the slit in the middle so as to be separated into a plurality of parts is used as the stopper portion. The annular engaging projection is inserted through the insertion hole by elastically deforming the bridge and expanding the slit, and is thus retained in the insertion hole by the bridge and is allowed to move relatively in the longitudinal direction of the bridge.

The second aspect of the invention is directed to the case where the hook portion that projects into the insertion hole is used as the stopper portion. The annular engaging projection is inserted through the insertion hole and is held by the hook portion, whereby the engaging projection is retained in the insertion hole, and the engaging projection is allowed to move relatively in the longitudinal direction of the hook portion.

The stopper portion recited in the third and fourth aspects of the invention has a tilt, so that the engaging projection is guided further into the insertion hole as a result of the relative movement that occurs due to the difference in thermal expansion in the direction in which the design surface becomes loose. Accordingly, the second member more closely contacts the first member. This more appropriately restrains the design surface from becoming loose or wrinkled, being lifted, etc.

MODES FOR CARRYING OUT THE INVENTION

The present invention is applied to vehicle interior parts such as a door trim, a luggage side trim, and an instrument panel, and ornaments etc. that are attached to the interior parts, but is also applicable to panel parts for applications other than vehicle applications. In the case of using the first member as the base member, relatively hard synthetic resin materials such as rigid polyvinyl chloride, polypropylene, polyethylene, and ABS are preferably used. However, the first member may be made of other materials such as a metal. In the case of using the first member as the upholstery material, or for the resin material of the second member, various thermoplastic resins such as plasticized polyvinyl chloride, styrene resin, olefin resin, and polyester resin are preferably used. The upholstery material is not limited to various resin materials, and may be a stacked material having woven fabric, nonwoven fabric, knitted fabric, etc. bonded to a resin sheet. In the case of using the first member as the upholstery material, a relatively hard base member may be placed on the back surface (on the opposite side from the protrusions) of the second member as necessary.

The multiplicity of protrusions that provide the cushioning properties have, e.g., a rectangular shape as viewed in plan, but may have various shapes such as a square shape, a circular shape, an elliptical shape, or a curved shape curved in an arc. Each protrusion may have a sectional shape that continuously changes in the direction in which the protrusion protrudes, such as a tapered shape in which the sectional area of the protrusion decreases toward the tip end thereof, or may have an asymmetrical shape with respect to a centerline in order to facilitate bending of the protrusion in one direction. All of the multiplicity of protrusions may have the same shape. However, the multiplicity of protrusions may be a mixture of a plurality of kinds of protrusions having different shapes. The protrusions are not limited to pin-shaped protrusions. For example, a multiplicity of elongated rib-like (flat plate-shaped) protrusions may be arranged parallel to each other or in a grid pattern.

In a curved portion that is curved two-dimensionally or three-dimensionally so as to provide a recessed design surface, the design surface tends to become loose or wrinkled, be lifted, etc. due to the shape of the curved portion, and it is desirable to connect the first and second members together by the engaging projection. However, such loosening, lifting, etc. of the design surface due to the difference in thermal expansion occurs not only in such a curved portion but also in a flat portion etc. Accordingly, the present invention is preferably applied not only to laminated composite parts having a curved portion so as to provide a recessed design surface, but also to laminated composite parts having various shapes, such as flat laminated composite parts that do not have such a curved portion or laminated composite parts having a curved shape so as to provide a protruded design surface.

The engaging projection inserted through the insertion hole is engaged with the stopper portion and retained in the insertion hole by the stopper portion, and is allowed to move relatively in the direction parallel to the design surface due to the difference in thermal expansion. The stopper portion has the predetermined length L in the direction of the relative movement. The direction of the relative movement that occurs due to the difference in thermal expansion and the predetermined length L are determined as appropriate in advance by experiments, simulations, etc. based on the shape of the design surface, the materials and thicknesses of the first and second members, etc. so as to restrain the design surface from becoming loose or wrinkled, being lifted, etc. The direction in which the engaging projection is allowed to move relatively, namely the direction in which the stopper portion extends, need not necessarily be exactly the same as the direction of the relative movement that occurs due to the difference in thermal expansion, and is determined so as to include a component of the direction of the relative movement. Namely, the engaging projection needs only to be relatively moved along the stopper portion due to the difference in thermal expansion so as to restrain the design surface from becoming loose or wrinkled, being lifted, etc.

It is desirable that the bridge of the first aspect of the invention be formed symmetrically by a pair of projecting bridges that project toward each other like a cantilever along a straight line, with a slit in the middle (clearance). However, the bridge may be formed asymmetrically. In the third and fourth aspects of the invention, the stopper portion has a tilt so that the engaging projection is guided further into the insertion hole. In the case of carrying out other aspects of the invention, however, the stopper portion needs only to be provided so as to at least allow the engaging projection to move relatively due to the difference in thermal expansion. For example, the stopper portion may extend substantially parallel to the design surface so that the engaging projection moves substantially parallel along the design surface. The tilt of the stopper portion may be provided such that only a surface on which the engaging projection is retained is tilted. However, for example, the stopper portion itself such as the hook portion of the second aspect of the invention may be tilted.

EMBODIMENTS

Embodiments of the present invention will be described in detail below with reference to the accompanying drawings.

Figure 1:
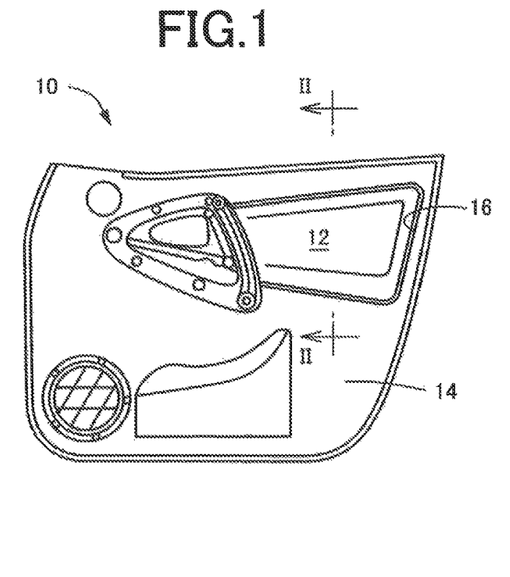
FIG. 1 is a schematic front view of an example of a vehicle door trim to which the present invention is applicable, as viewed from the design surface side.
Figure 2:
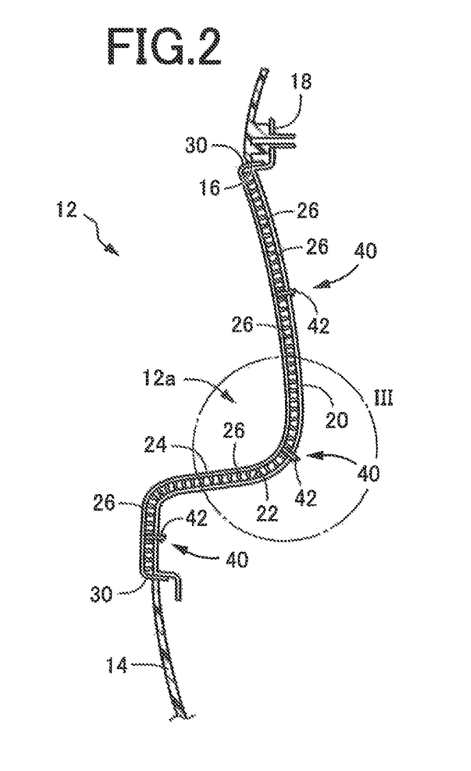
FIG. 2 is an enlarged sectional view of the vehicle door trim taken along line II-II and viewed in the direction of arrows in FIG. 1.
Figure 3:
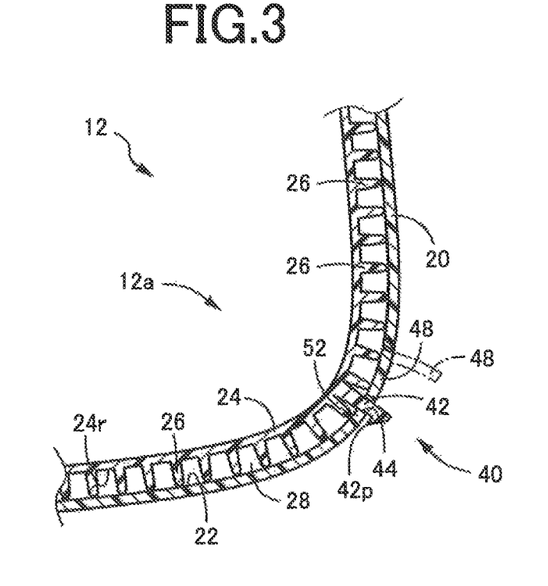
FIG. 3 is an enlarged sectional view of a portion III of an armrest part in FIG. 2.

FIG. 1 is a schematic front view of a vehicle door trim 10 to which the present invention is applicable, as viewed from the design surface side, namely from the interior of a vehicle. FIG. 2 is an enlarged sectional view of the vehicle door trim 10 taken along line II-II and viewed in the direction of arrows in FIG. 1. That is, FIG. 2 is a longitudinal section of an armrest part 12 mounted in the vehicle door trim 10. FIG. 3 is an enlarged sectional view of a portion III in FIG. 2. The armrest part 12 corresponds to the laminated composite part. The armrest part 12 is fitted in an opening 16 in a door trim body 14 from the back side (the right side in FIG. 2) of the door trim body 14, and is fixedly attached to the door trim body 14 via a plurality of attachment portions 18 provided at the peripheral edge of the armrest part 12.

The armrest part 12 is formed by a three-dimensionally curved plate-shaped base member 20, and an upholstery material 24 placed on a front surface 22 of the base member 20 so as to be substantially parallel to the front surface 22. The upholstery material 24 is the second member, and is molded as a single-piece member with a relatively soft, elastically deformable synthetic resin material such as plasticized polyvinyl chloride. A multiplicity of fine protrusions 26 that protrude toward the front surface 22 of the base member 20 are formed integrally with a back surface 24r of the upholstery material 24, namely a surface of the upholstery material 24 on the base member 20 side, so as to spread all over the back surface 24r of the upholstery material 24. These fine protrusions 26 create space 28 between the upholstery material 24 and the front surface 22. An outer peripheral terminal portion 30 of the upholstery material 24 covers and is fixed to an outer peripheral edge of the base member 20 with the tip ends of the fine protrusions 26 being in close contact with the front surface 22. As the armrest part 12 is fitted in the opening 16 of the door trim body 14, the outer peripheral terminal portion 30 is pressed against the outer peripheral edge of the base member 20 by the opening 16, and is thus kept in close contact with the outer peripheral edge. However, as necessary, the outer peripheral terminal portion 30 may be fixed to the outer peripheral edge of the base member 20 by fixing means such as an adhesive. The base member 20 corresponds to the first member, and is molded as a single-piece member with a synthetic resin material harder than the upholstery material 24, such as polypropylene. The attachment portions 18 are provided integrally with the base member 20. The fine protrusions 26 correspond to the protrusions, and the front surface 22 of the base member 20 corresponds to the mating surface. Woven fabric, nonwoven fabric, etc. may be placed on the front surface of the upholstery material 24, namely the design surface on the opposite side of the upholstery material 24 from the fine protrusions 26.

Figure 4:
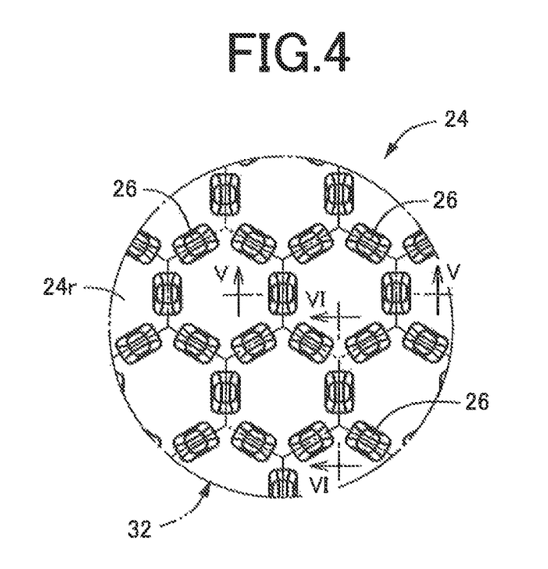
FIG. 4 is an enlarged plan view of a multiplicity of fine protrusions formed on a back surface of an upholstery material in FIG. 3, as viewed in the direction perpendicular to the back surface.
Figure 5:
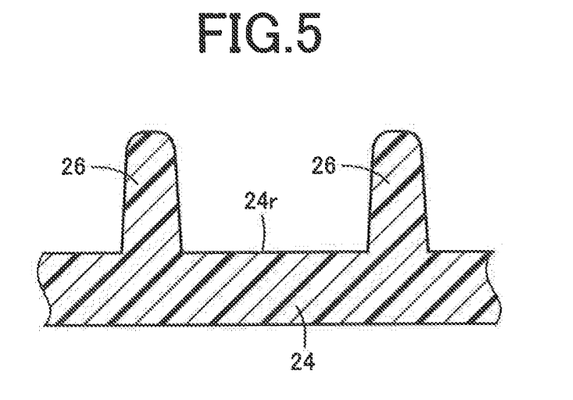
FIG. 5 is an enlarged longitudinal section taken along line V-V and viewed in the direction of arrows in FIG. 4.
Figure 6:
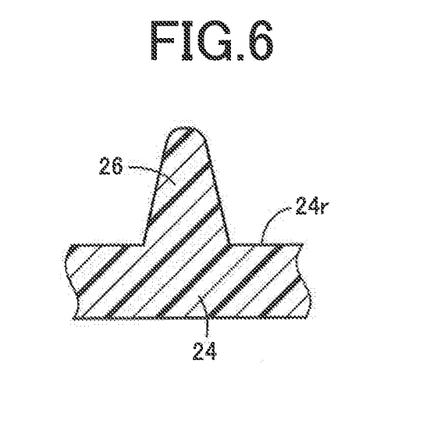
FIG. 6 is an enlarged longitudinal section taken along line VI-VI and viewed in the direction of arrows in FIG. 4.

FIG. 4 is a diagram illustrating the multiplicity of fine protrusions 26 formed on the back surface 24r of the upholstery material 24, which is an enlarged plan view as viewed in the direction perpendicular to the back surface 24r. FIG. 5 is an enlarged longitudinal section taken along line V-V and viewed in the direction of arrows in FIG. 4. FIG. 6 is an enlarged longitudinal section taken along line VI-VI and viewed in the direction of arrows in FIG. 4. As can be seen from these figures, the multiplicity of fine protrusions 26 have the same shape, and have a longitudinal shape (in the present embodiment, a rectangular shape) as viewed in plan (in the state shown in FIG. 4). The fine protrusions 26 are arranged in a grid pattern 32 of a multiplicity of polygons of the same shape in which adjoining ones of the polygons have a common side such that the fine protrusions 26 form the sides of the polygons. In the present embodiment, the fine protrusions 26 have a rectangular shape with four round corners as viewed in plan and are arranged in such an attitude that the longitudinal directions of the fine protrusions 26 correspond to the sides of the polygons. As shown by long dashed double-short dashed lines in FIG. 4, the grid pattern 32 is a honeycomb pattern, namely a repeated pattern of regular hexagons of a fixed size as the polygons, and the fine protrusions 26 are provided so that a single fine protrusion 26 is located on the middle part of each side of the regular hexagons.

FIGS. 5 and 6 are sectional views specifically showing an example of the fine protrusions 26. The fine protrusions 26 have a gently tapered shape so that its sectional area decreases toward its tip end. Both a longitudinal section in FIG. 5 taken along the lateral direction perpendicular to the longitudinal direction and a longitudinal section in FIG. 6 taken along the longitudinal direction have a symmetrical shape with respect to a neutral plane perpendicular to the back surface 24r, and the peripheral edge of the tip end of each fine protrusion 26 (both ends of the tip end of the sectional shape) is rounded as viewed in these longitudinal sections. The dimensions and angles of each part of the fine protrusions 26 are determined as appropriate in view of the material of the upholstery material 24 etc. so that a predetermined feel (soft feel etc.) is provided.

The fine protrusions 26 are merely in contact with the front surface 22 of the base member 20. Accordingly, in a curved portion that is curved two-dimensionally or three-dimensionally so as to provide a recessed design surface, such as an inwardly curved portion 12a in FIG. 2, there is a risk that a gap may appear between the front surface 22 of the base member 20 and the fine protrusions 26, and the upholstery material 24 may therefore become loose or wrinkled or be lifted and abnormal noise may be generated due to a position shift associated with such a loose or lifted upholstery material 24. This may impair the product quality. The portion III in FIG. 2, namely the portion shown in FIG. 3, is the inwardly curved portion 12a. Even in a portion other than the inwardly curved portion 12a, there is also a risk that the upholstery material 24 may become loose, be lifted, etc. due to the difference in thermal expansion between the base member 20 and the upholstery material 24. That is, if the upholstery material 24 has a higher coefficient of thermal expansion than the base member 20, and the upholstery material 24 is attached to the base member 20 such that the fine protrusions 26 of the upholstery material 24 appropriately closely contact the front surface 22 of the base member 20 at room temperature, the upholstery material 24 may become loose at high temperatures due to the difference in thermal expansion.

As a solution to this problem, in the above armrest part 12, the upholstery material 24 is connected to the base member 20 via connection mechanisms 40 at a plurality of positions including the inwardly curved portion 12a in order to prevent the upholstery material 24 from becoming loose, being lifted, etc. The connection mechanisms 40 are shown as a reference example. The connection mechanisms 40 will be specifically described with reference to FIGS. 3 and 7A to 7D. The connection mechanism 40 includes engaging projections 42 formed so as to stand on the back surface 24r of the upholstery material 24, and an insertion hole 44 formed in the base member 20. Each engaging projection 42 projects to a larger extent than the fine protrusions 26 and has a retaining claw 42p at its tip end. When the upholstery material 24 is placed on the base member 20 and attached thereto such that the fine protrusions 26 closely contact the front surface 22 of the base member 20, the tip ends of the engaging projections 42 are relatively inserted through the insertion hole 44 so as to project beyond a back surface of the base member 20. The retaining claws 42p are caught by the peripheral edge of the opening of the insertion hole 44, so that the engaging projections 42 are retained in the insertion hole 44. The upholstery material 24 is thus connected to the base member 20 and is prevented from being lifted etc. For example, the engaging projections 42 are molded integrally with the upholstery material 24. However, the engaging projections 42 may be formed as separate members from the upholstery material 24 and may be fixedly attached to the back surface 24r of the upholstery material 24 by welding, an adhesive, etc.

Figure 7A:
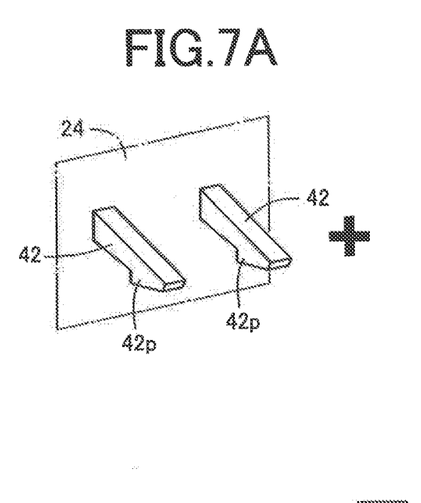
FIGS. 7A to 7D show views illustrating how to place the upholstery material on a base member while inserting engaging projections in FIG. 3 through the insertion hole and attach the upholstery material to the base member.
Figure 7B:
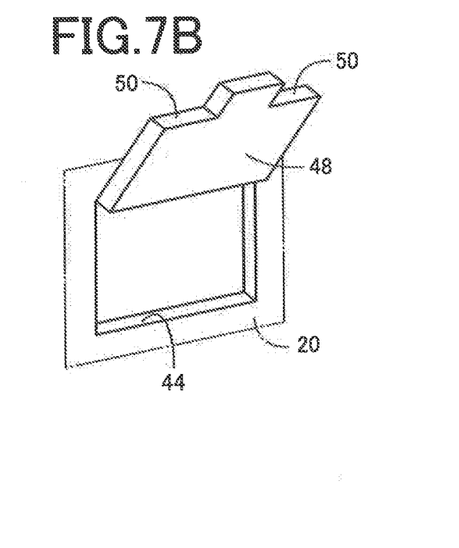
Figure 7C:
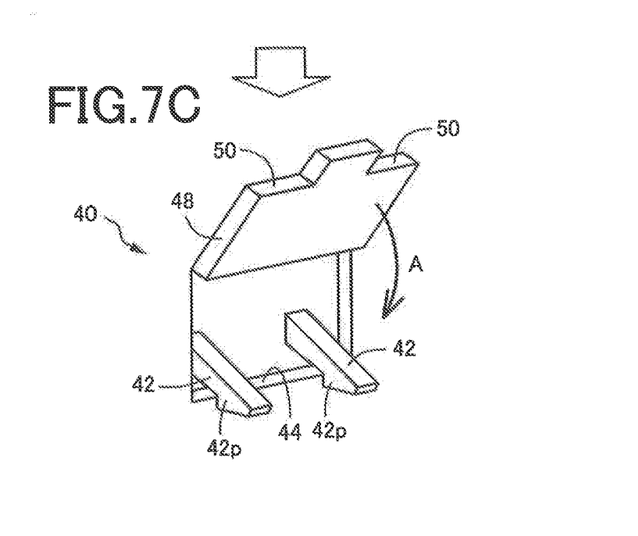
Figure 7D:
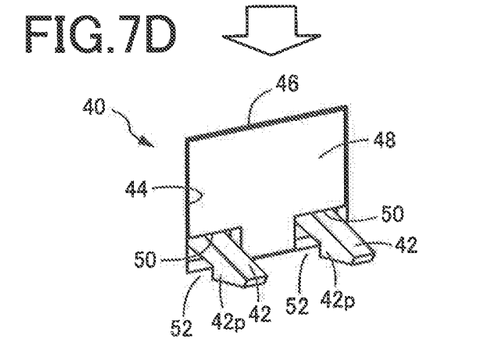

FIGS. 7A to 7D show views illustrating how to place the upholstery material 24 on the base member 20 while inserting the engaging projections 42 through the insertion hole 44 and attach the upholstery material 24 to the base member 20. FIG. 7A is a perspective view of the engaging projections 42 on the back surface 24r of the upholstery material 24, FIG. 7B is a perspective view of the insertion hole 44 formed in the base member 20, FIG. 7C is a perspective view of the pair of engaging projections 42 inserted through the insertion hole 44, and FIG. 7D is a perspective view of the engaging projections 42 positioned so as to be caught by the peripheral edge of the opening of the insertion hole 44. The upholstery material 24 having the engaging projections 42 corresponds to the one member, and the base member 20 having the insertion hole 44 corresponds to the other member. The multiplicity of fine protrusions 26 formed on the back surface 24r of the upholstery material 24 are not shown in FIGS. 7A to 7D. Similarly, the fine protrusions 26 are not shown in FIGS. 9A to 9C, 10A to 10C, and 11.

As can be seen from FIGS. 7A to 7D, the insertion hole 44 has a rectangular shape sufficiently larger than a region including the pair of engaging projections 42, so that these engaging projections 42 can be inserted through the insertion hole 44 with sufficient clearance. A lid member 48 is formed integrally with one of the long sides of the peripheral edge of the opening of the rectangular insertion hole 44 via an integral hinge 46 such that the lid member 48 can be opened and closed. As shown in FIGS. 7B and 7C, the engaging projections 42 are inserted into the lid member 48 being opened wide and the insertion hole 44 opening wide. The lid member 48 has rectangular notches 50 in its two corners so that the notches correspond to the pair of engaging projections 42. When the lid member 48 is closed as shown by arrow A and is fitted and fixed in the insertion hole 44 as shown in FIG. 7D, the engaging projections 42 are positioned by the notches 50 and are held in the retained state, or the state where the retaining claws 42p are caught by the peripheral edge of the opening of the insertion hole 44 and retained in the insertion hole 44. Of the peripheral edge of the opening of the insertion hole 44, those portions which catch the retaining claws 42p of the engaging projections 42 positioned by the notches 50, namely the right and left portions of the lower long side in FIG. 7D, function as stopper portions 52. For example, the lid member 48 is press-fitted in the insertion hole 44 and is fixed closed.

Figure 8:
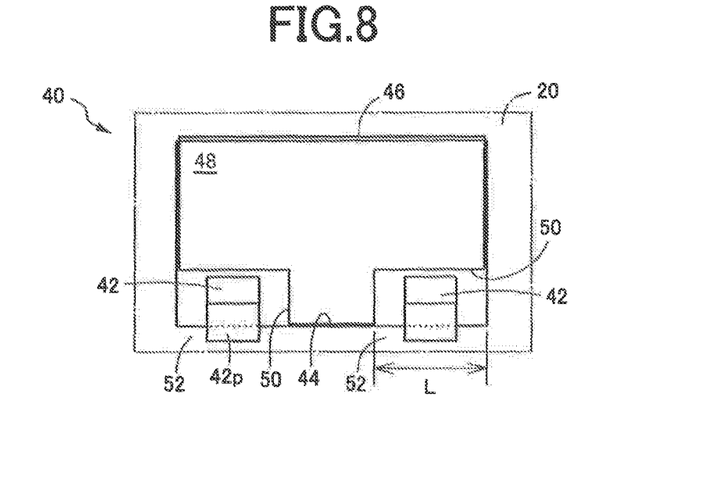
FIG. 8 is a front view showing the state where a lid member is closed so that the engaging projections are caught by stopper portions of the insertion hole according to the procedures shown in FIGS. 7A to 7D.

FIG. 8 is a front view (as viewed from the back side of the base member 20) showing the state where the upholstery material 24 is attached to the base member 20 and the lid member 48 is closed so that the engaging projections 42 are caught by the stopper portions 52 of the insertion hole 44 according to the procedures shown in FIGS. 7A to 7D. The notches 50 have a sufficiently larger length dimension L than the engaging projections 42 so that the engaging projections 42 can move relative to the base member 20 within the range of the length dimension L. This allows the engaging projections 42 to move relative to the stopper portions 52 in the direction parallel to the design surface, namely in the direction parallel to the direction tangential to the base member 20 and the upholstery material 24, due to the difference in thermal expansion between the upholstery material 24 and the base member 20. The direction in which the engaging projections 42 are allowed to move relatively, namely the direction in which the stopper portions 52 extend, which is the longitudinal direction of the insertion hole 44 in the reference example, is determined as appropriate in advance by experiments, simulations, etc. based on the shape of the design surface, the materials and thicknesses of the upholstery material 24 and the base member 20, etc. so as to restrain the upholstery material 24 from becoming loose or wrinkled, being lifted, etc. due to the difference in thermal expansion. That is, the longitudinal direction of the insertion hole 44 may be determined so as to include a component of the direction of the relative movement that occurs due to the difference in thermal expansion between the upholstery material 24 and the base member 20. The length dimension L within which the relative movement can be made is similarly determined as appropriate by experiments, simulations, etc. so as to restrain the upholstery material 24 from becoming loose or wrinkled, being lifted, etc. due to the difference in thermal expansion.

According to such an armrest part 12 of the reference example, the stopper portions 52 that are engaged with the engaging projections 42 and retain the engaging projections 42 in the insertion hole 44 have the predetermined length L, and the engaging projections 42 are allowed to move relatively within the range of the length dimension L in the direction parallel to the design surface due to the difference in thermal expansion between the upholstery material 24 and the base member 20. This appropriately restrains the upholstery material 24 from becoming loose or wrinkled, being lifted, etc. due to the difference in thermal expansion and improves the product quality. That is, since the engaging projections 42 can move relative to the base member 20, an effect due to the difference in thermal expansion is reduced (lessened) as the engaging projections 42 move to a peripheral portion of normal temperature etc. where the difference in thermal expansion is smaller. Accordingly, local loosening or local lifting of the upholstery material 102 as in the case where the engaging projections 104 are placed at the fixed positions as in FIG. 12 can be inhibited.

The lid member 48 is attached to the insertion hole 44 so as to allow the engaging projections 42 to move relatively and so as to maintain the retained state where the retaining claws 42p are caught by the stopper portions 52. Accordingly, the insertion hole 44 sufficiently larger than the engaging projections 42 can be used, and the engaging projections 42 can be easily and quickly inserted into the insertion hole 44 when the upholstery material 24 is placed on the base member 20 and attached thereto. Workability in attaching the upholstery material 24 to the base member 20 can thus be improved.

Embodiments of the present invention will be described below. In the following embodiments, substantially the same portions as those of the above reference example are denoted with the same reference characters, and detailed description thereof will be omitted.

Figure 9A:
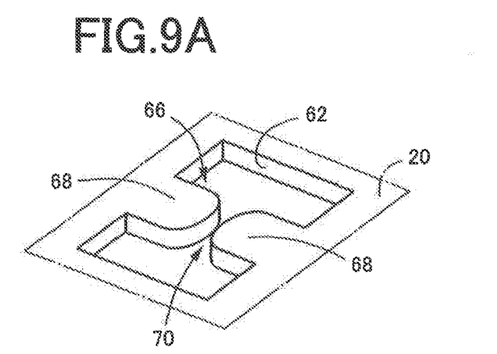
FIGS. 9A to 9C show perspective views showing the states before and after an upholstery material is placed on a base member and attached thereto by inserting an annular engaging projection through an insertion hole, illustrating an embodiment of the first aspect of the invention.
Figure 9B:
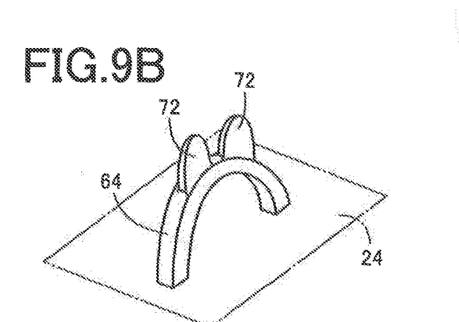
Figure 9C:
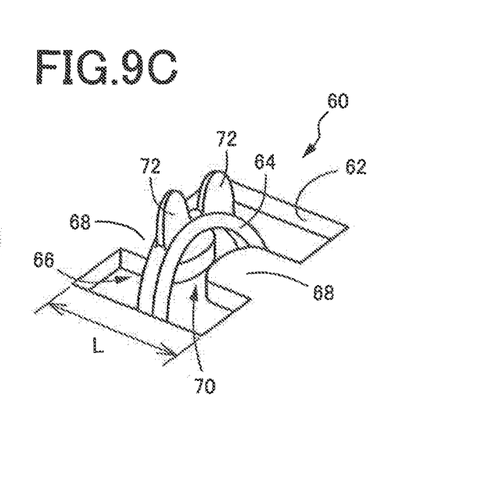

A connection mechanism 60 in FIG. 9C is provided instead of the connection mechanism 40 in order to connect the upholstery material 24 to the base member 20. FIGS. 9A to 9C are the embodiment of the first aspect of the invention and show perspective views showing the states before and after the upholstery material 24 is placed on the base member 20 and attached thereto. FIG. 9A is a perspective view of an insertion hole 62 formed in the base member 20, FIG. 9B is a perspective view of an engaging projection 64 on the back surface 24r of the upholstery material 24, and FIG. 9C is a perspective view of the upholstery material 24 and the base member 20 connected together with the engaging projection 64 inserted through the insertion hole 62. The insertion hole 62 has a rectangular shape, and a bridge 66 is formed so as to connect the pair of parallel long sides of the insertion hole 62 together. The bridge 66 functions as a stopper portion and has symmetrically a pair of projecting bridges 68 that project toward each other like a cantilever along a straight line parallel to the short sides of the insertion hole 62. There is clearance 70 between the tip ends of the pair of projecting bridges 68. This clearance 70 corresponds to the slit.

The engaging projection 64 has an annular shape, namely a semicircular arc shape or an inverted U-shape, and has a pair of holding portions 72 projecting from its tip end portion. For example, the engaging projection 64 is formed as a separate member from the upholstery material 24 and is fixedly attached to the back surface 24*r* of the upholstery material 24 by welding, an adhesive, etc. The engaging projection 64 is inserted through the insertion hole 62 by moving the engaging projection 64 toward the insertion hole 62 such that the pair of holding portions 72 are located on both sides of the bridge 66 and holding and pulling the holding portions 72 such that the engaging projection 64 elastically deforms the pair of projecting bridges 68 and expands the clearance 70. As shown in FIG. 9C, the bridge 66 thus extends through the opening of the annular engaging projection 64, so that the engaging projection 64 is retained in the insertion hole 62 by the bridge 66 and is allowed to move relatively within the range of the longitudinal length dimension L of the bridge 66. The clearance 70 is smaller than the thickness dimension of the engaging projection 64, and there is no risk that the engaging projection 64 may come off through the clearance 70. In the present embodiment, the longitudinal direction of the bridge 66, namely the short sides of the insertion hole 62, are determined so as to include a component of the direction of the relative movement that occurs due to the difference in thermal expansion between the upholstery material 24 and the base member 20.

In the present embodiment, the annular engaging projection 64 is inserted through the insertion hole 62 by elastically deforming the bridge 66 and expanding the clearance 70, and is thus retained in the insertion hole 62 by the bridge 66. The bridge 66 has the predetermined length L and the engaging projection 64 is allowed to move relatively within the range of the length dimension L in the direction parallel to the design surface due to the difference in thermal expansion between the upholstery material 24 and the base member 20. As in the above reference example, this appropriately restrains the upholstery material 24 from becoming loose or wrinkled, being lifted, etc. due to the difference in thermal expansion and improves the product quality.

Figures 10A, 10B, 10C:
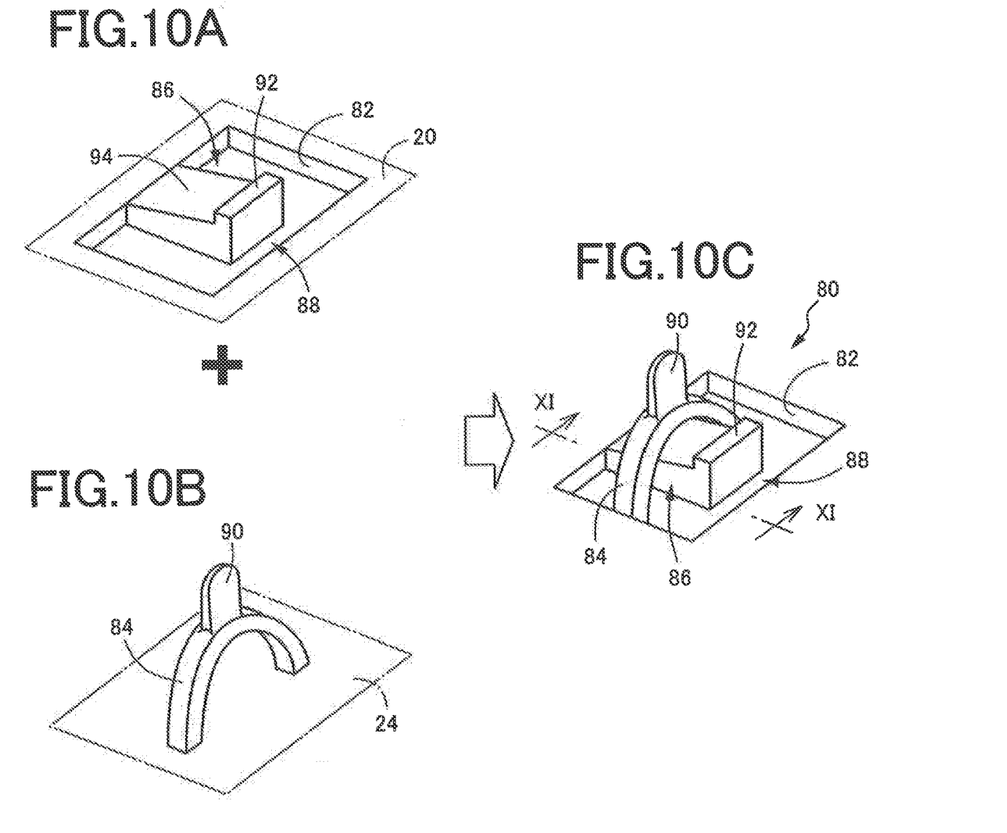
FIGS. 10A to 10C show perspective views showing the states before and after an upholstery material is placed on a base member and attached thereto by inserting an annular engaging projection through an insertion hole, illustrating embodiments of the second to fourth aspects of the invention.
Figure 11:
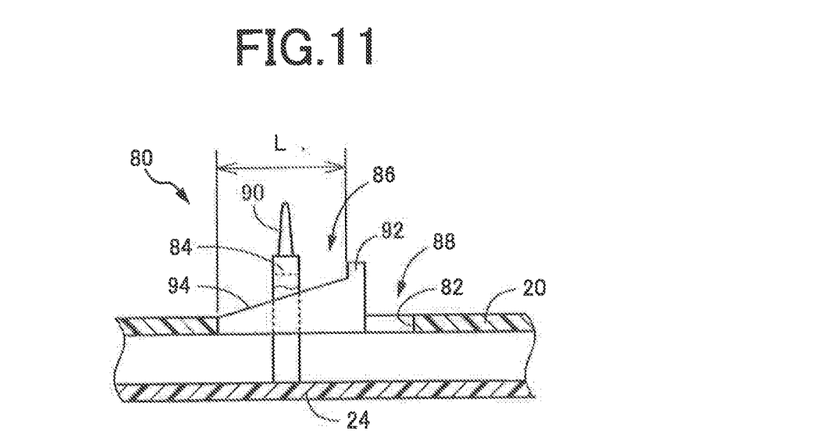
FIG. 11 is a sectional view taken along line XI-XI and viewed in the direction of arrows in FIG. 10C.

A connection mechanism 80 in FIG. 10C is provided instead of the connection mechanism 40 in order to connect the upholstery material 24 to the base member 20. FIGS. 10A to 10C are the embodiments of the second to fourth aspects of the invention and show perspective views showing the states before and after the upholstery material 24 is placed on the base member 20 and attached thereto. FIG. 11 is a sectional view taken along line XI-XI and viewed in the direction of arrows in FIG. 10C. FIG. 10A is a perspective view of an insertion hole 82 formed in the base member 20, FIG. 10B is a perspective view of an engaging projection 84 on the back surface 24*r* of the upholstery material 24, and FIG. 10C is a perspective view of the upholstery material 24 and the base member 20 connected together with the engaging projection 84 inserted through the insertion hole 82. The insertion hole 82 has a rectangular shape, and a hook portion 86 is formed on one of the long sides of the insertion hole 82 so as to project into the insertion hole 82. The hook portion 86 functions as a stopper portion, and extends parallel to the short sides of the insertion hole 82 like a cantilever such that clearance 88 is left between the tip end of the hook portion 86 and the other long side of the insertion hole 82.

The engaging projection 84 has an annular shape, namely a semicircular arc shape or an inverted U-shape, and has a holding portion 90 at its tip end portion. For example, the engaging projection 84 is formed as a separate member from the upholstery material 24 and is fixedly attached to the back surface 24*r* of the upholstery material 24 by welding, an adhesive, etc. The engaging projection 84 is inserted through the insertion hole 82 and is held by the hook portion 86 by moving the engaging projection 84 toward the insertion hole 82 such that the holding portion 90 is located in the clearance 88 and holding and pulling the holding portion 90. As shown in FIG. 10C, the hook portion 86 thus extends through the opening of the annular engaging projection 84, so that the engaging projection 84 is retained in the insertion hole 82 by the hook portion 86 and is allowed to move relatively within the range of the longitudinal length dimension L of the hook portion 86. In order to prevent the engaging projection 84 from coming off, the hook portion 86 has a stopper 92 formed at its tip end so as to project from the hook portion 86. In the present embodiment, the longitudinal direction of the hook portion 86, namely the short sides of the insertion hole 82, are determined so as to include a component of the direction of the relative movement that occurs due to the difference in thermal expansion between the upholstery material 24 and the base member 20.

The upper surface of the hook portion 86, namely a retaining surface 94 on which the engaging projection 84 is held, is a tilted surface tilted toward the back surface of the base member 20, namely tilted to the opposite side from the upholstery material 24, as the retaining surface 94 extends to the tip end of the hook portion 86. Accordingly, as the engaging projection 84 is moved toward the tip end of the hook portion 86 as a result of the relative movement that occurs due to the difference in thermal expansion, the engaging projection 84 is guided further into the insertion hole 82 by the tilt of the retaining surface 94, so that the upholstery material 24 is moved toward the base member 20. The direction in which the retaining surface 94 is tilted is determined as appropriate so that the engaging projection 84 is guided further into the insertion hole 82 when the upholstery material 24 expands at high temperatures and is moved relative to the base member 20 due to the difference in thermal expansion.

In the present embodiment, the annular engaging projection 84 is inserted through the insertion hole 82 and is held by the hook portion 86, whereby the engaging projection 84 is retained in the insertion hole 82. The hook portion 86 has the predetermined length L in the longitudinal direction thereof, and the engaging projection 84 is allowed to move relatively within the range of the length dimension L in the direction parallel to the design surface due to the difference in thermal expansion between the upholstery material 24 and the base member 20. As in the above reference example, this appropriately restrains the upholstery material 24 from becoming loose or wrinkled, being lifted, etc. due to the difference in thermal expansion and improves the product quality.

The retaining surface 94 of the hook portion 86 is a tilted surface, so that the engaging projection 84 is guided further into the insertion hole 82 as a result of the relative movement that occurs due to the difference in thermal expansion in the direction in which the design surface becomes loose, namely due to the difference in thermal expansions at high temperatures. Accordingly, the upholstery material 24 is moved toward the base member 20 and closely contacts the base member 20. This more appropriately restrains the design surface from becoming loose or wrinkled, being lifted, etc.

Although the embodiments of the present invention are described above in detail based on the drawings, these embodiments are shown by way of example only, and the present invention can be embodied in various modified or improved forms based on the knowledge of those skilled in the art.

REFERENCE SIGNS LIST

12: Armrest part (Laminated composite part) 20: Base member (First member, the other of the first and second members) 22: Front surface (Mating surface) 24: Upholstery material (Second member, one of the first and second members) 26: Fine protrusions (Protrusions) 28: Space 64, 84: Engaging projection 62, 82: Insertion hole 66: Bridge (Stopper portion) 70: Clearance (Slit) 86: Hook portion (Stopper portion) 94: Retaining surface (Tilted surface) L: Length dimension

The invention claimed is:

1. A laminated composite part, which includes a first member having a predetermined mating surface, and a second member that is made of an elastically deformable resin material, that has a plate portion substantially parallel to the mating surface and having a multiplicity of protrusions formed integrally therewith so as to protrude toward the mating surface so that space is created between the plate portion and the mating surface, and that is placed on the first member such that the protrusions contact the mating surface, which has cushioning properties as tip ends of the protrusions are pressed against the mating surface and elastically deformed, and in which one of the first and second members which is located on a design surface side has an engaging projection that projects to a larger extent than the protrusions, and the engaging projection is inserted through an insertion hole formed in the other of the first and second members and is retained in the insertion hole, whereby the first and second members are connected together, the insertion hole being provided integrally with a stopper portion that is engaged with the engaging projection to retain the engaging projection in the insertion hole, in order to allow the engaging projection to move relative to the stopper portion in a direction parallel to the design surface due to a difference in thermal expansion between the first and second members, the stopper portion having a predetermined length in a direction of the relative movement that occurs due to the difference in thermal expansion, the stopper portion being a bridge extending across the insertion hole and having a slit in a middle so as to be separated into a plurality of parts, and the engaging projection having an annular shape and being inserted through the insertion hole such that the engaging projection elastically deforms the bridge and expands the slit, and the bridge thus extending through an opening of the annular shape, so that the engaging projection is retained in the insertion hole by the bridge and is allowed to move relatively in a longitudinal direction of the bridge.

2. The laminated composite part according to claim 1, wherein the bridge has a pair of projecting bridges projecting toward each other, and the pair of projecting bridges overlap with each other in the longitudinal direction of the bridge.

3. The laminated composite part according to claim 1, wherein the engaging projection is inserted through the insertion hole such that a tip end portion of the engaging projection protrudes from the whole of the other of the first and second members.

4. A laminated composite part, which includes a first member having a predetermined mating surface, and a second member that is made of an elastically deformable resin material, that has a plate portion substantially parallel to the mating surface and having a multiplicity of protrusions formed integrally therewith so as to protrude toward the mating surface so that space is created between the plate portion and the mating surface, and that is placed on the first member such that the protrusions contact the mating surface, which has cushioning properties as tip ends of the protrusions are pressed against the mating surface and elastically deformed, and in which one of the first and second members which is located on a design surface side has an engaging projection that projects to a larger extent than the protrusions, and the engaging projection is inserted through an insertion hole formed in the other of the first and second members and is retained in the insertion hole, whereby the first and second members are connected together, the insertion hole being provided integrally with a stopper portion that is engaged with the engaging projection to retain the engaging projection in the insertion hole, in order to allow the engaging projection to move relative to the stopper portion in a direction parallel to the design surface due to a difference in thermal expansion between the first and second members, the stopper portion having a predetermined length in a direction of the relative movement that occurs due to the difference in thermal expansion, the stopper portion being a hook portion that is cantilevered and that projects into the insertion hole, and the engaging projection having an annular shape, the engaging projection being inserted through the insertion hole and being held by the hook portion so that the engaging projection is retained in the insertion hole, and the engaging projection being allowed to move relatively in a longitudinal direction of the hook portion.

5. The laminated composite part according to claim 4, wherein a surface of the stopper portion on an opposite side from the one of the first and second members has a tilt which is tilted to the opposite side from the one of the first and second members as the tilt extends to a tip end of the stopper portion so that the engaging projection is guided further into the insertion hole as a result of the relative movement of the engaging projection toward the tip end of the stopper portion that occurs due to the difference in thermal expansion.

6. The laminated composite part according to claim 4, wherein the hook portion has a stopper formed at a tip end of the hook portion so as to project from the hook portion.

7. The laminated composite part according to claim 4, wherein the engaging projection is inserted through the insertion hole such that a tip end portion of the engaging projection protrudes from the whole of the other of the first and second members.

8. A laminated composite part, which includes a first member having a predetermined mating surface, and a second member that is made of an elastically deformable resin material, that has a plate portion substantially parallel to the mating surface and having a multiplicity of protrusions formed integrally therewith so as to protrude toward the mating surface so that space is created between the plate portion and the mating surface, and that is placed on the first member such that the protrusions contact the mating surface, which has cushioning properties as tip ends of the protrusions are pressed against the mating surface and elastically deformed, and in which one of the first and second members which is located on a design surface side has an engaging projection that projects to a larger extent than the protrusions, and the engaging projection is inserted through an insertion hole formed in the other of the first and second members and is retained in the insertion hole, whereby the first and second members are connected together, the insertion hole being provided integrally with a stopper portion that is engaged with the engaging projection to retain the engaging projection in the insertion hole, in order to allow the engaging projection to move relative to the stopper portion in a direction parallel to the design surface due to a difference in thermal expansion between the first and second members, the stopper portion having a predetermined length in a direction of the relative movement that occurs due to the difference in thermal expansion, and a surface of the stopper portion on an opposite side from the one of the first and second members having a tilt which is tilted to the opposite side from the one of the first and second members as the tilt extends to a tip end of the stopper portion so that the engaging projection is guided further into the insertion hole as a result of the relative movement of the engaging projection toward the tip end of the stopper portion that occurs due to the difference in thermal expansion.

9. The laminated composite part according to claim 8, wherein the stopper portion has a stopper formed at the tip end of the stopper portion so as to project from the stopper portion.

10. The laminated composite part according to claim 8, wherein the engaging projection is inserted through the insertion hole such that a tip end portion of the engaging projection protrudes from the whole of the other of the first and second members.

* * * * *